United States Patent [19]

Gallas et al.

[11] Patent Number: 4,576,366
[45] Date of Patent: Mar. 18, 1986

[54] ANTIVIBRATION ELASTIC SUPPORT

[75] Inventors: Gérard Gallas; Loic Raher; Bernard Renzo, all of Nantes, France

[73] Assignee: Compagnie des Produits Industriels de l'Quest (C.P.I.O.), Cedex, France

[21] Appl. No.: 536,649

[22] Filed: Sep. 28, 1983

[30] Foreign Application Priority Data

Sep. 28, 1982 [FR] France .................................. 82 16279

[51] Int. Cl.⁴ ......................... B60G 13/00; F16F 9/30
[52] U.S. Cl. .................................... 267/8 R; 188/268; 267/140.1; 267/153
[58] Field of Search .................. 188/268, 269, 322.5, 188/381; 267/140.1, 153, 63, 9 R, 8 R, 35, 152, 136, 140, 139, 140.2, 140.4, 141.1, 141, 150; 248/562

[56] References Cited

U.S. PATENT DOCUMENTS

| 3,415,470 | 12/1968 | Woodford et al. | 188/322.5 X |
| 3,610,610 | 10/1971 | Chassagne | 267/152 |
| 3,897,856 | 8/1975 | Pineau | 188/322.5 X |
| 4,005,858 | 2/1977 | Lochner | 188/268 X |
| 4,182,441 | 1/1980 | Strong et al. | 188/322.5 X |
| 4,342,446 | 8/1982 | Eaton et al. | 267/35 |
| 4,383,679 | 5/1983 | Kakimoto | 267/140.1 X |

FOREIGN PATENT DOCUMENTS

| 2503581 | 8/1976 | Fed. Rep. of Germany | 267/140.1 |
| 2456260 | 1/1981 | France | 267/141 |

Primary Examiner—Douglas C. Butler
Attorney, Agent, or Firm—Oblon, Fisher, Spivak, McClelland & Maier

[57] ABSTRACT

An antivibration elastic support, particularly for the power plants of autovehicles. It essentially consists of an elastomer hollow unit (1), made to adhere to two rigid reinforcements (2)-(3) during vulcanization, the lower reinforcement (3) exhibiting an opening that can be stopped by an additional rigid reinforcement (4), the fluid-tight chamber (5), consisting of the walls of the hollow elastomer unit (1) and the reinforcements (2)-(4), being at least partially filled with a material that is easily deformable by outside application of energy, with absorption of the latter.

2 Claims, 12 Drawing Figures

ANTIVIBRATION ELASTIC SUPPORT

BACKGROUND OF THE INVENTION

This invention relates to an antivibration elastic support with an incorporated damping device, applicable particularly to the suspension of the power plants of automobiles.

It is known that these elastic supports have the main role of filtering vibrations due to imperfections in the balance of the engine. For this reason, these supports should have a great flexibility. Unfortunately, this leads to a considerable deterioration of comfort under the effect of low-frequency vibrations coming from the road; these latter vibrations are transmitted because of insufficient damping of the supports which are generally made of elastomer. In other words, the desired characteristics are:

a well defined static rigidity, because the prime role of such a support is to carry the static load that is applied to it;

a certain damping, during stresses of low frequency up to 10 to 20 Hertz and of great amplitude on the order of 0.5 to 5 mm to limit the vibrations of the suspended mass;

a slight dynamic stiffening at high frequencies of about 50 to 300 Hertz to preserve good characteristics of filtering these vibrations which are generators of noise.

One of the properties of viscoelastic materials of the elastomer type is the increase of the rate of dynamic stiffening with the frequency, therefore the progressive degradation of filtering of the vibrations. This increase is the more pronounced the more the mixture is damping. Advances made in formulating the mixtures often end in acceptable compromises. However, it appears that the limit of the possibilities of improvement by this means has now been reached.

Devices are already known which make it possible to separate the "damping" function from the "rigidity" function. One of them associates a flexible elastic support with a shock absorber, but this solution is costly and inefficient for damping oscillations of slight amplitude, because of mechanical frictions in the shock absorbers. Further, installation of shock absorbers can be particularly difficult in the small volume of an engine compartment.

Other solutions consist in incorporating a hydraulic or pneumatic damping device in the support itself by using the deformation of the support itself to displace a fluid through an orifice. These solutions are not perfectly satisfactory because they do not give sufficient consideration to the existence of different amplitude vibrations. Further, these devices generally exhibit large dimensions, result in a gain in damping overall only in a single direction of stress and do not make it possible to obtain a given rate of rigidities in two perpendicular directions which is generally desired by automobile manufacturers.

SUMMARY OF THE INVENTION

This invention, which reduces the above drawbacks, consists essentially of a flexible elastomer enclosure providing the "rigidity" function and of an easily deformable volume, of the modeling clay type, which provides the "damping" function.

This material, which hereafter will be called "damping material," at least partially dissipates the incident energy necessary for its deformation, which can be reproduced an almost infinite number of times without causing its degradation.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
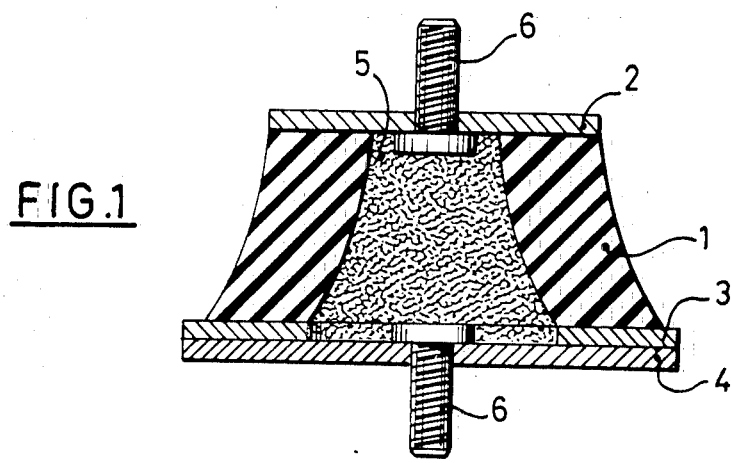
FIG. 1 is a cross section of a first embodiment of the invention.

With reference to FIG. 1, it is seen that the antivibration support according to the invention consists essentially of a hollow elastomer unit 1 made in the shape of a truncated cone, made to adhere to rigid reinforcements 2 and 3 during vulcanization. An additional lower reinforcement 4 is solidly and hermetically connected to reinforcement 3. Reinforcements 2 and 4 comprise mechanical elements making possible the fastening of the support to its work station. These mechanical elements can be screws 6 welded as in the case of FIG. 1. Fluid-tight chamber 5 thus constituted is totally or partially filled with a volume of damping material.

This material has a dynamic viscosity between $10^{-2}$ and $10^{33}$ poiseuilles at ambient temperatures. Good results were obtained, for example, with a known material.

The damping material can also be a non-Newtonian fluid and some of them can have thixotropic or rheopexic properties. For example, it is possible to add a methyl polymethacrylate solution in a suitable synthesis oil or a material comprising at least a liquid phase made up of silicone, polyglycol, mineral oil and/or a saturated aliphatic or aromatic carboxylic acid ester to which ground graphite and at least a wetting agent are added.

Another damping material according to the invention consists of a non-Newtonian viscous dispersion comprising a silicone type oil with a viscosity between 10 and 10/4 poiseuilles at ambient temperature and glass balls uniformly distributed therein, whose granulometry is between 40 and 90 microns. The ratio of the masses of the glass balls to the silicone oil is on the order of 3 to 8. In the case of this material, the desired energy dispersion results from the friction of the glass beads against one another, thereby causing a certain damping of the vibrations coming from the engine. This filling is performed before or after fastening of reinforcement 4 onto reinforcement 3. In this latter case, at least one of reinforcements 2 or 4 should be provided with a device making it possible to fill chamber 5, for example, an orifice, which should assure a perfect fluid tightness of chamber 5 after filling.

The support that has just been described functions as follows: the deformation of rubber 1 occurring at constant volume, any relative deformation of reinforcements 2-3 causes a deformation of the geometry of chamber 5 and consequently of the damping material it contains, hence an appreciable gain over the damping value.

It can be seen immediately that this gain depends on:
the amplitude of the movement considered;
the damping material used, particularly on its more or less great compressibility and its damping quality for a given movement;
the geometry of the elastomer unit (i.e., tests showed that it has considerable importance).

It will be noted that the above device indeed offers the following advantages:
its size is identical with that of the all-rubber supports now used;
it causes a gain in damping regardless of the direction of the stress;
its dynamic stiffening is approximately equal to that of the elastomer unit, provided the damping material and the geometry of unit 1 are suitably selected.

Actually, it can be seen that the damping gain is very slight, even zero, for very slight amplitudes of vibrations since they cause only very slight deformations of chamber 5.

it makes it possible to obtain a given ratio of rigidity in two perpendicular directions as easily as with the all-rubber supports now used;
its simplicity guarantees its reliability;
its industrial embodiment is easy and less costly than those of solutions known so far.

Figure 2:
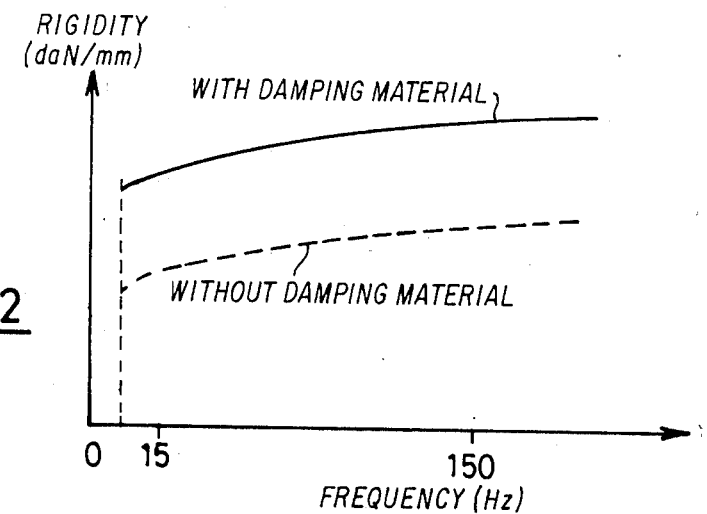
FIGS. 2 and 3 include two curves respectively showing the incidence of the damping material on the rigidity and damping as a function of the frequencies.
Figure 3:
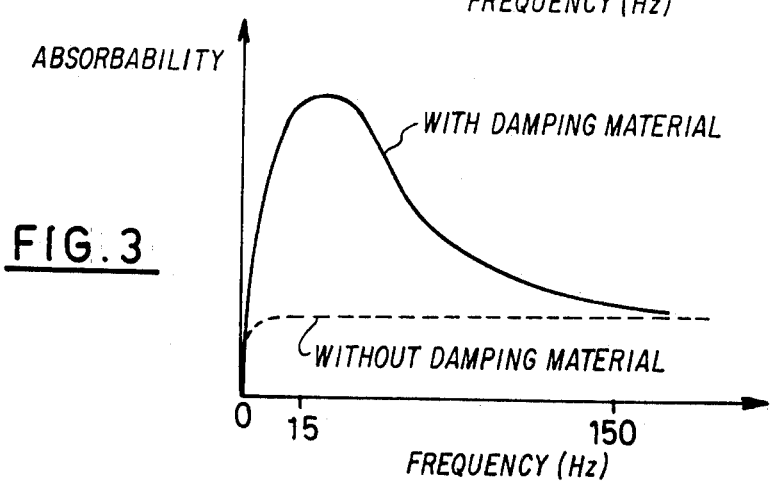

To illustrate the above, FIGS. 2 and 3 show a comparative diagram of these frequency responses of the device with or without damping material. FIG. 2 shows that the presence of damping material in the support causes an increase of rigidity of the device regardless of the frequency. However, this gain in rigidity is almost constant regardless of the excitation frequency, and it follows that the two curves have almost identical slopes and consequently the damping material causes little or no increase in the rate of dynamic stiffening commonly characterized by:

$$"t" = \frac{k^{150}}{k^{15}} = \frac{\text{rigidity at 150 Hz}}{\text{rigidity at 15 Hz}}$$

Consequently, a high damping is obtained at low frequencies while the rate of dynamic stiffening changes little or not at all.

Figure 4:
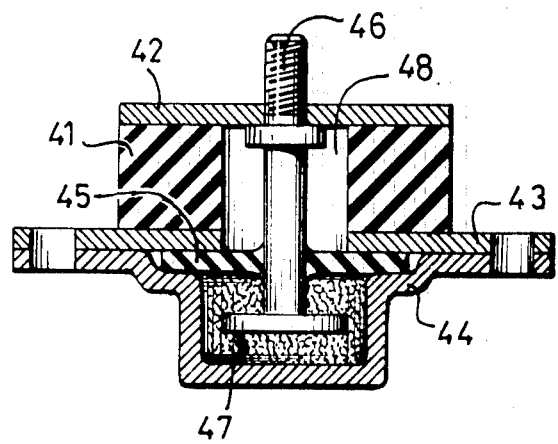
FIG. 4 shows a first variant of the invention, seen in cross section.

An improvement of the above device can be seen in FIG. 4. According to this variant, the support comprises an elastomer unit 41 which is made to adhere to reinforcements 42 and 43 during vulcanization. An elastomer element 45 is connected solidly and hermetically to an element 46 called a "piston," for example, by causing element 45 to adhere during vulcanization. This unit (45, 46) is connected solidly and hermetically to reinforcement 42 by any known means, such as crimping, etc. A housing 44 is fastened to reinforcement 43 by exerting a constant stress on element 45. Thus a fluid-tight chamber 47 is defined which is filled with a damping material as above. Chamber 48 is fluid-tight and filled with air. The support of FIG. 4 functions as follows:

Any relative movement of reinforcement 42 and 43 causes a relative movement of piston 46 in chamber 47 and consequently a deformation of the damping material.

The advantages of this device in relation to that of FIG. 1 are the following:

a higher value of the damping gain. Actually, for a given relative movement of reinforcements 42 and 43, the deformation of the damping material is much greater, provided the geometry of element 46 which is present in chamber 47 is well selected.

a slighter dispersion over damping. It is obtained, taking into account the slight dimensional dispersion of the metal elements (44 and 46) in relation to the homologous rubber elements of FIG. 1. Actually, it is well known that, particularly in regard to the rigidity of a rubber element, the series embodiment can meet it only at ±15%. Therefore, considerable dispersions result from the geometric variation of chamber 5 of the device of the type of FIG. 1, for a given relative movement of reinforcement 2 and 3. With the devices of the type of FIG. 2, this drawback is eliminated since chamber 47 and piston 46 are essentially rigid.

Preferably the device of the type of FIG. 2 will be used when very high damping values are sought. This result will be obtained by selecting the geometry of piston 46 so that the deformation of the absorbing material is maximum for a given relative movement of reinforcements 42 and 43. In this case, the damping will be considerable even if the relative movement is of a very slight amplitude; this causes a high rigidity for high-frequency vibrations and consequently a slight degradation of acoustic comfort.

Figure 5:
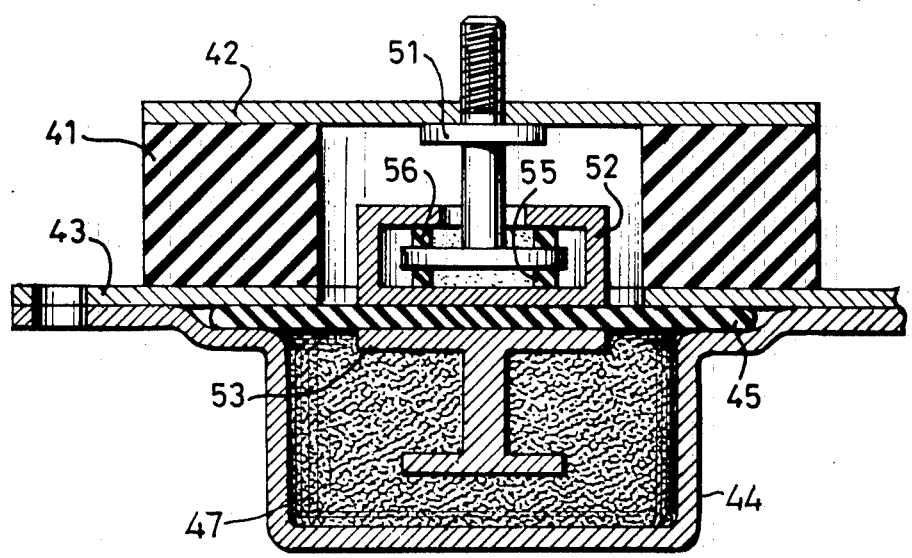
FIG. 5 illustrates a detail of the unit of FIG. 4, seen in section, showing a modification of one of the elements of the device.

To remedy this drawback, this first variant of the invention will be improved by modifying it in the sense of FIG. 5 according to which piston 46 of FIG. 4 is replaced by a device called a "filtered piston," which allows the relative movements of parts 51-52 without piston 53 deforming the damping material, these relative movements being closely linked to the mechanical play, which is selected arbitrarily, and made during assembly of parts 51 and 52.

According to this embodiment, piston 46 and its holding rod forming a single piece, according to FIG. 4, are divided into three movable parts, i.e., piston 53 and parts 52 and 51. The piston 53, and also part 52 which is opposite it, are made to adhere to elastomer element 45 during vulcanization.

Part 52 constitutes a container whose edges are crimped, after introduction of a base of part 51, for holding reinforcement 42, thus avoiding its further disengagement. The base of part 51 exhibits a flare on its faces with which elastomer wedges 55-66, intended to assure centering of the two parts 52-51, are connected.

The above device therefore allows slight relative movements of parts 51-52 without piston 53 deforming the damping material, hence a slight damping and consequently a low rigidity at high frequency. On the other hand, for larger movements (for example, greater than 0.2 mm) elastomer wedges 55 and 56 are flattened. The lower flare of part 51 then being against part 52, carries it in its movement, then deforming the damping material by element 53, which then causes a high damping.

The arrangement of FIGS. 6 to 10 is a synthesis of the variant described in FIGS. 1 and 4-5, contributing the advantages of compactness.

Figure 6:
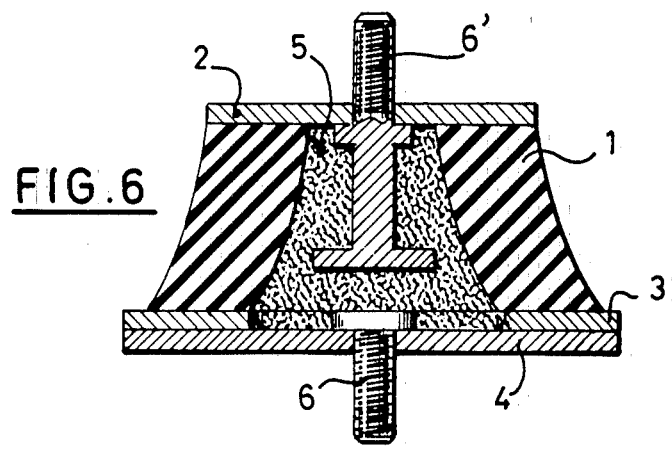
FIG. 6 shows a hollow elastomer unit in the shape of a truncated cone.

Thus, FIG. 6 shows hollow elastomer unit 1 made in the shape of a truncated cone, made to adhere to rigid reinforcements 2-3, additional lower reinforcement 4 and fastening element 6 during vulcanization. In the same way, hollow volume 5 is wholly or partially filled with the damping material.

However, there will be noted in the volume the presence of piston 46 working as in the case of this figure but housed on the inside of the elastomer device, which naturally makes it possible to have greater compactness in relation to FIG. 4, because of the absence of housing 44.

Figure 7A:
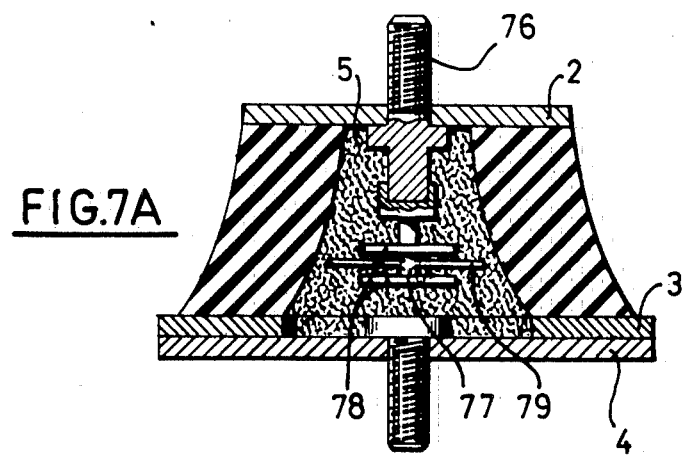
FIG. 7A shows a variation of the unit shown in FIG. 6.
Figure 7B:
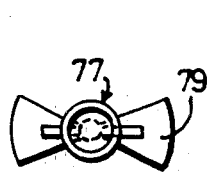
FIG. 7B shows the base of the unit in FIG. 7A.

A variant of the preceding Figure, illustrated in FIGS. 7A and 7B, bears essentially on the piston. Its base 77, preferably of synthetic material and, although one piece, consists of three parts, namely, two stops 78 and an element 79 centered between these stops and intended to deform the damping material. The geometry and thickness of this centered element 79 are selected so that it bends when a force is applied to it (see FIG. 7B). Element 77 is solidly connected to the rod of element 76 (by molding, gluing, friction welding), this latter being hermetically fastened to reinforcement 2.

The support, thus made, operates as follows: during a relative movement of slight amplitude of reinforcement 2 in relation to reinforcement 3, central element 79 of slight thickness bends under the resistant force due to the absorbing material; this causes little deformation of the absorbing material, therefore little stiffening. On the other hand, when these movements have greater amplitude, element 79 of slight thickness comes in contact with stops 78 provided for this purpose, which in turn move in the damping material, hence allowing for high damping.

Figure 7C:
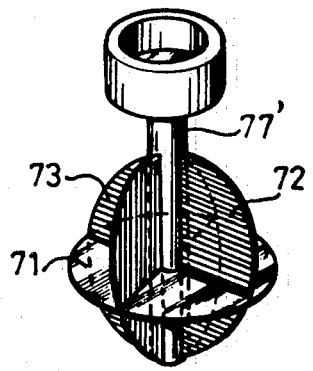
FIG. 7C shows a different type of base to be used in the unit of FIG. 7A.

FIG. 7C shows a variant of the preceding device. Base 77 of the piston, preferably of synthetic material, comprises three disks 71-72-73 positioned in three perpendicular planes. The bracing thus obtained makes possible a damping gain that is almost identical in all directions and particularly with shearing.

The embodiment of these devices is inexpensive but has limits, because it can be seen that the piston deforms the damping material even for very slight relative movements of reinforcements 2-3.

Other devices will now be described which reduce the above drawbacks. According to these systems, the "filtered" type piston can move and therefore deform the damping material only if it is in contact with the stops provided for this purpose. In the absence of this contact, the only deformation that the damping material can undergo is that resulting from deformation of chamber 5.

Figure 8:
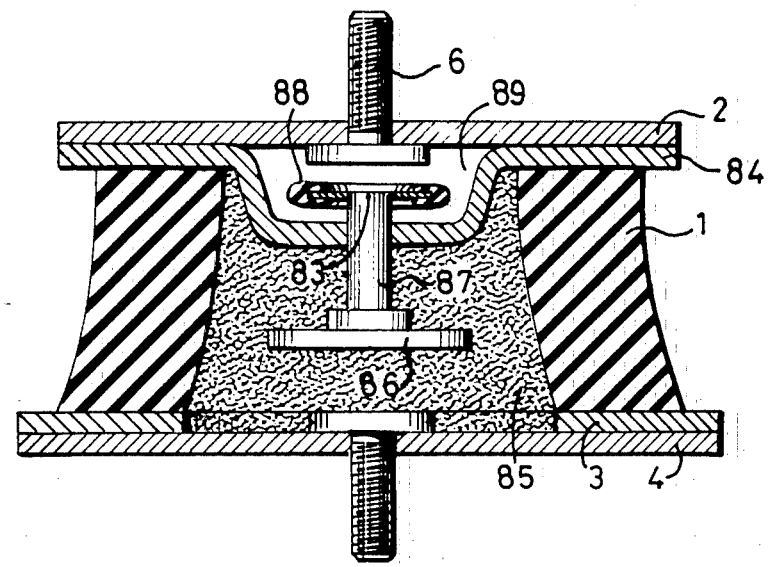
FIG. 8 shows a hollow elastomer unit which utilizes a piston assembly.
Figure 9:
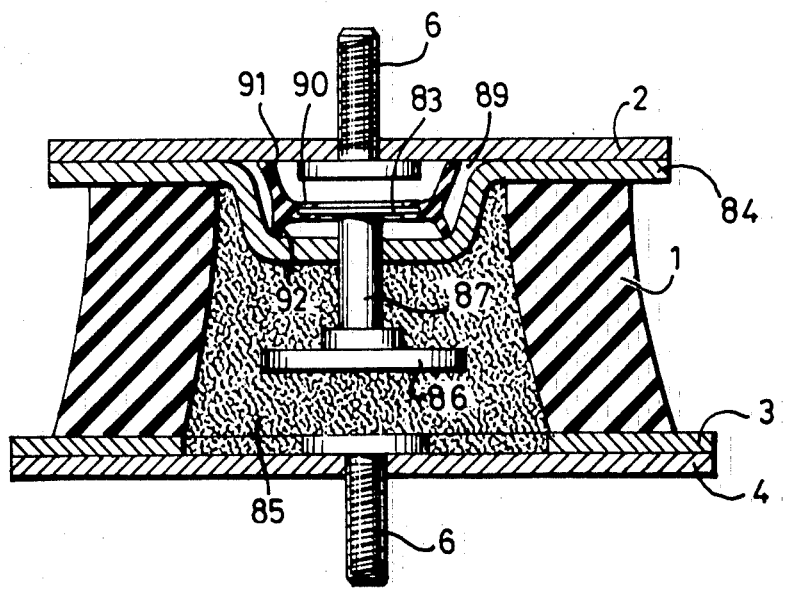
FIG. 9 shows a variation of the unit of FIG. 8.

The embodiment of FIG. 8 makes it possible to separate piston 87 from elastic device 1-2-3-4 for vibrations of slight amplitude.

Piston 87 has an upper flare 83 edged by a ring 88 of a material assuring a silent contact when this part is stopped, and a lower flare 86 preferably of synthetic material obtained by molding, thus making possible the realization of very varied geometry, parts 86 and 97 being made solid especially by friction welding.

Piston 86-87 moves in chamber 85 partially or wholly filled with damping material, while its upper part 83 moves in an air-filled chamber 89 consisting of reinforcement 2 and a part 84 which is solid with it, comprising a central depression and an opening of a size suited to the fluid-tight passage of part 87 of the piston.

Precision machining of said opening and optional use of suitable antifriction materials for one or both parts above make it possible to optimize filtering of vibrations of slight amplitude. Fluid tightness between these two parts is still further improved according to the embodiment of FIG. 9 which differs from the preceding device only by the presence of a centering part 90 placed on the upper flare 83 of piston 87 in place of ring 88.

Centering part 90 is of elastomer and exhibits an upper edge 91 and a lower edge 92 respectively able to rest on reinforcement 2 and part 84. The particular structure of this part 90 prevents piston 87 from striking against part 84, regardless of the static load applied to the device; this would then cause a high damping for vibrations of slight amplitude, constituting a phenomenon that is harmful in itself.

Figure 10:
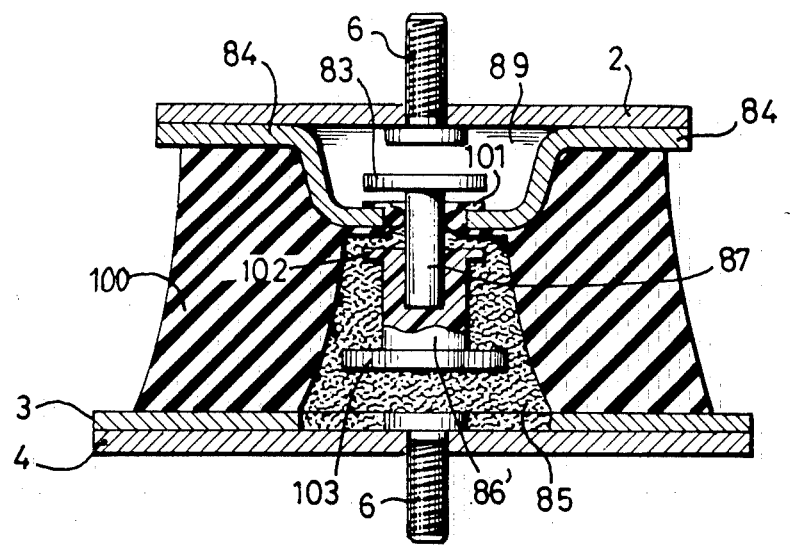
FIG. 10 shows a further variation of the unit of FIG. 8.

According to FIG. 10, an effort is made to perfect fluid tightness between central part 87 of the piston and the central opening of part 84. It is seen that elastomer part 100 in the shape of a truncated cone is extended by a zone 101 constituting a fluid-tight seal between the two preceding parts. It will be noted that seal 101 could be of a material different from that of support 100 to the extent that its characteristics of slight friction would be incompatible with the nature of support 100 which exhibits a slight dynamic stiffening. In this case, seal 101 would be added, for example, clipped or glued, on the edges of the opening of part 84.

It is further note that centering part 90, if necessary, can be suited to upper flare 83 of the piston, this latter, moreover, being able to exhibit several flares such as 102, 103 to the extent that it is desired to increase the value of its damping during its movement in cavity 85.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An antivibration elastic support comprising:
   a first and second reinforcement member;
   an elastomeric unit interconnecting said first and second reinforcement member and having a first fluid tight chamber formed therein;
   a movable member connected to said first reinforcement member and including a base;
   a housing connected to said second reinforcement member and forming a second fluid tight chamber, said second fluid tight chamber having a damping material positioned therein;
   a container within which said base of said movable member is positioned;
   a piston located within said housing;
   an elastomeric element secured between said housing and said second reinforcement member wherein said elastomeric element further interconnects said container and said piston; and
   at least one elastomer member positioned between said base of said movable member and an inner wall of said container.

2. An antivibration elastic support as set forth in claim 1, wherein said at least one elastomer member further comprises an elastomer member disposed on opposite sides of said base.

* * * * *